(12) United States Patent
Novotny et al.

(10) Patent No.: US 11,511,680 B2
(45) Date of Patent: Nov. 29, 2022

(54) INTERIOR COMPONENT OF A VEHICLE

(71) Applicants: AGC GLASS EUROPE, Louvain-la-Neuve (BE); INTERNATIONAL AUTOMOTIVE COMPONENTS GROUP GMBH, Duesseldorf (DE)

(72) Inventors: Marek Novotny, Namur (BE); Carter Scott Cannon, Munich (DE); Sung-Uk Kim, Grafing (DE)

(73) Assignees: AGC GLASS EUROPE, Louvain-la-Neuve (BE); INTERNATIONAL AUTOMOTIVE COMPONENTS GROUP GMBH, Duesseldorf (DE)

( * ) Notice: Subject to any disclaimer, the term of this patent is extended or adjusted under 35 U.S.C. 154(b) by 0 days.

(21) Appl. No.: 17/278,499

(22) PCT Filed: Sep. 25, 2019

(86) PCT No.: PCT/EP2019/075915
§ 371 (c)(1),
(2) Date: Mar. 22, 2021

(87) PCT Pub. No.: WO2020/064863
PCT Pub. Date: Apr. 2, 2020

(65) Prior Publication Data
US 2022/0032856 A1    Feb. 3, 2022

(30) Foreign Application Priority Data
Sep. 25, 2018    (DE) .................... 10 2018 123 616.6

(51) Int. Cl.
*H04R 1/02*    (2006.01)
*H04R 1/34*    (2006.01)
(Continued)

(52) U.S. Cl.
CPC ...... *B60R 11/0223* (2013.01); *B60R 13/0243* (2013.01); *B60R 13/0262* (2013.01);
(Continued)

(58) Field of Classification Search
CPC ............. B60R 11/0223; B60R 13/0243; B60R 13/0262; B60R 2011/0007;
(Continued)

(56) References Cited

U.S. PATENT DOCUMENTS 4,514,599 A * 4/1985 Yanagishima ........... H04R 1/24
                                                               381/431
6,243,473 B1   6/2001 Azima et al.
(Continued)

FOREIGN PATENT DOCUMENTS

EP    3 177 036 A1    6/2017
EP    3 203 758 A1    8/2017
(Continued)

OTHER PUBLICATIONS

International Search Report dated Mar. 30, 2020 in PCT/EP2019/075915 filed Sep. 25, 2019, 8 pages.
(Continued)

*Primary Examiner* — Oyesola C Ojo
(74) *Attorney, Agent, or Firm* — Oblon, McClelland, Maier & Neustadt, L.L.P.

(57) ABSTRACT

An interior component of a vehicle comprises a carrier having a front face directed toward a passenger compartment of the vehicle and an opposite rear face; a speaker including an at least partially transparent diaphragm and a transducer coupled to the diaphragm. Movement of the transducer causes vibration of the diaphragm to generate sound by vibration of the diaphragm, the diaphragm having a front face directed towards the passenger compartment and an opposite rear face. The carrier provides a support along
(Continued)

Figure 1:
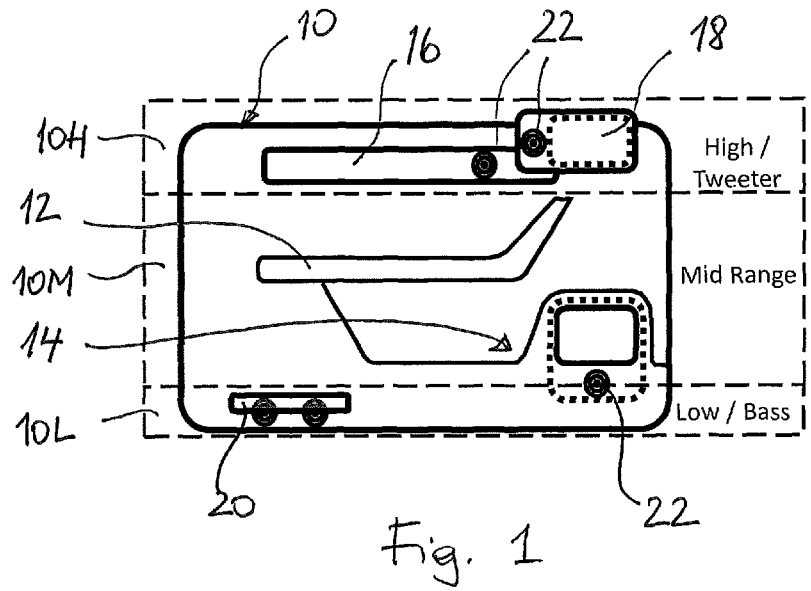

at least part of the periphery of the diaphragm where the diaphragm is attached to the carrier where the front face and the rear face of the diaphragm are free of the carrier across a part of the diaphragm surface so that the diaphragm is suspended in the carrier of the interior component.

26 Claims, 10 Drawing Sheets

(51) Int. Cl.
*H04R 7/12* (2006.01)
*H04R 17/00* (2006.01)
*F21V 33/00* (2006.01)
*H04R 31/00* (2006.01)
*B60R 11/02* (2006.01)
*B60R 13/02* (2006.01)
*H04R 7/18* (2006.01)
*H04R 7/26* (2006.01)
*F21W 106/00* (2018.01)
*B60R 11/00* (2006.01)

(52) U.S. Cl.
CPC ............ *H04R 1/025* (2013.01); *H04R 1/345* (2013.01); *H04R 7/125* (2013.01); *H04R 7/18* (2013.01); *H04R 7/26* (2013.01); *H04R 17/00* (2013.01); B60R 2011/0007 (2013.01); B60R 2011/0021 (2013.01); B60R 2011/0029 (2013.01); B60R 2013/0287 (2013.01); F21V 33/0056 (2013.01); F21W 2106/00 (2018.01); H04R 31/003 (2013.01); H04R 2307/023 (2013.01); H04R 2307/025 (2013.01); H04R 2400/11 (2013.01); H04R 2499/13 (2013.01)

(58) Field of Classification Search
CPC ..... B60R 2011/0021; B60R 2011/0029; B60R 2013/0287; H04R 1/025; H04R 1/345; H04R 7/125; H04R 7/18; H04R 7/26; H04R 17/00; H04R 31/003; H04R 2307/023; H04R 2307/025; H04R 2400/11; H04R 2499/13; H04R 1/028; H04R 1/24; H04R 1/28; H04R 7/14; H04R 2440/05; H04R 7/10; H04R 7/20; F21V 33/0056; F21W 2106/00; G10K 11/28

See application file for complete search history.

(56) References Cited

U.S. PATENT DOCUMENTS

| | | | |
|---|---|---|---|
| 6,332,029 B1 | 12/2001 | Azima et al. | |
| 6,389,147 B1* | 5/2002 | Rush | H04R 5/02 381/86 |
| 6,868,937 B2* | 3/2005 | Cass | H04R 5/02 181/192 |
| 6,904,154 B2 | 6/2005 | Azima et al. | |
| 7,050,593 B1* | 5/2006 | Emerling | H04R 5/02 181/161 |
| 7,227,969 B2* | 6/2007 | Maekawa | B60R 11/0217 381/345 |
| 8,103,024 B2* | 1/2012 | Bachmann | H04R 5/023 381/387 |
| 2003/0031337 A1* | 2/2003 | D'Hoogh | H04R 9/063 381/396 |
| 2003/0066596 A1* | 4/2003 | Van Manen | B60R 13/0268 264/156 |
| 2005/0147273 A1 | 7/2005 | Azima et al. | |
| 2005/0147274 A1 | 7/2005 | Azima et al. | |
| 2006/0159293 A1 | 7/2006 | Azima et al. | |
| 2008/0279412 A1* | 11/2008 | Bertoli | H04R 1/025 381/389 |
| 2009/0169031 A1 | 7/2009 | Iimori et al. | |
| 2010/0224437 A1* | 9/2010 | Booth | H04R 7/26 181/166 |
| 2010/0316236 A1* | 12/2010 | Snider | H04R 7/045 52/173.1 |
| 2012/0186903 A1 | 7/2012 | Booth et al. | |
| 2014/0341403 A1 | 11/2014 | Booth et al. | |
| 2015/0256912 A1* | 9/2015 | Nedelman | B60R 13/0237 296/146.7 |
| 2017/0201834 A1 | 7/2017 | Nozaki | |
| 2017/0215007 A1* | 7/2017 | Noro | H04R 9/06 |
| 2018/0227654 A1* | 8/2018 | Majkowski | H04R 1/028 |
| 2021/0297785 A1* | 9/2021 | Zhang | H04R 9/046 |

FOREIGN PATENT DOCUMENTS

| | | | |
|---|---|---|---|
| JP | 2792204 B2 * | 9/1998 | ............... H04R 7/02 |
| JP | 2004-56564 A | 2/2004 | |
| WO | WO 00/45616 A1 | 8/2000 | |
| WO | WO 2007/065909 A1 | 6/2007 | |
| WO | WO 2010/063320 A1 | 6/2010 | |

OTHER PUBLICATIONS

LEDmagic, "LED Magic Mirror with speakers," Youtube, Retrieved from the Internet [URL: https://www.youtube.com/watch?v=ooouYdktWI8], XP054980019, Jun. 11, 2014, 1 page.
Søren T. Christensen, et al., "Shape optimization of a loudspeaker diaphragm with respect to sound directivity properties," Control and Cybernetics, vol. 27, No. 2, XP055670715, 1998, pp. 177-198.
Richard Slawsky, "Creating Immersive In-Store Experiences with Directional Audio," Retrieved from the Internet [URL: http://hypersound.com/pro/wp-content/uploads/2016/03/WP_Turtlebeach_Creating-Immersive-In-Store-Experiences-with-Directional-Audio.pdf], XP055675001, Dec. 2014, 5 pages.
Anonymous, "Vibration Speaker Technology—Massive Force : Micro Vibrations," Retrieved from the Internet: [URL:https://web/archive.org/web/20160628065515/https://www.feonic.com/vibration-speaker-technology], XP055675062, Jun. 28, 2016, 11 pages.
Olivier Mal, et al. "A Novel Glass Laminated Structure for Flat Panel Loudspeakers", Audio Engineering Society Convention Paper Presented at the 124th Convention in Amsterdam, The Netherlands: May 17-20, 2008.
Marek Novotny, et al.. "A Novel Glass Laminated Structure For Flat Panel Loudspeakers" (2008), www.agc-audioglass.com.

* cited by examiner

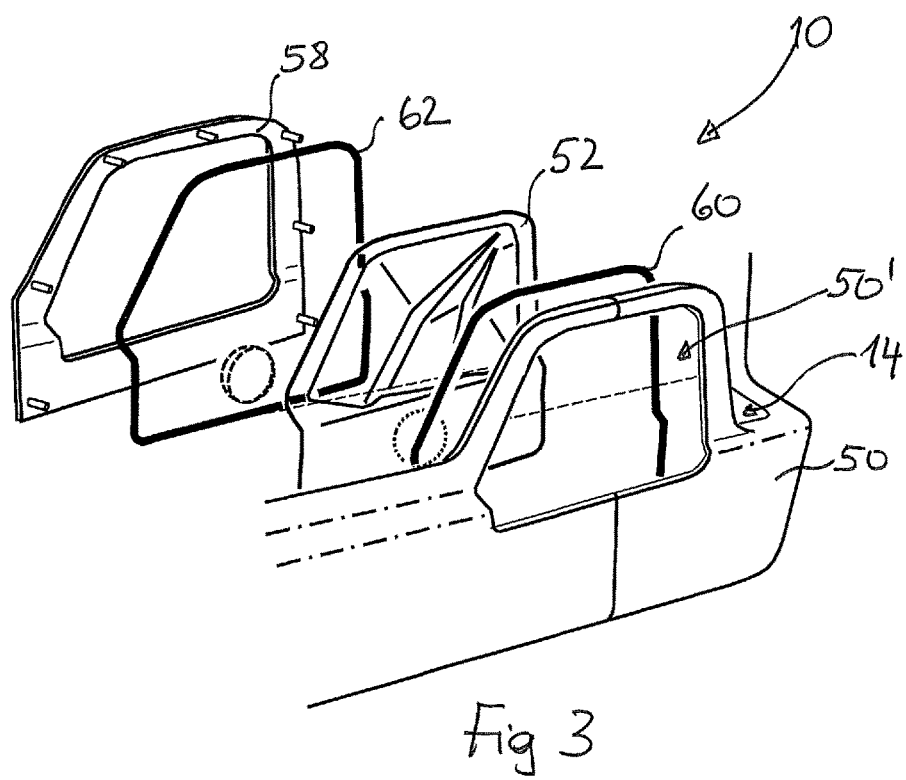
Fig 3
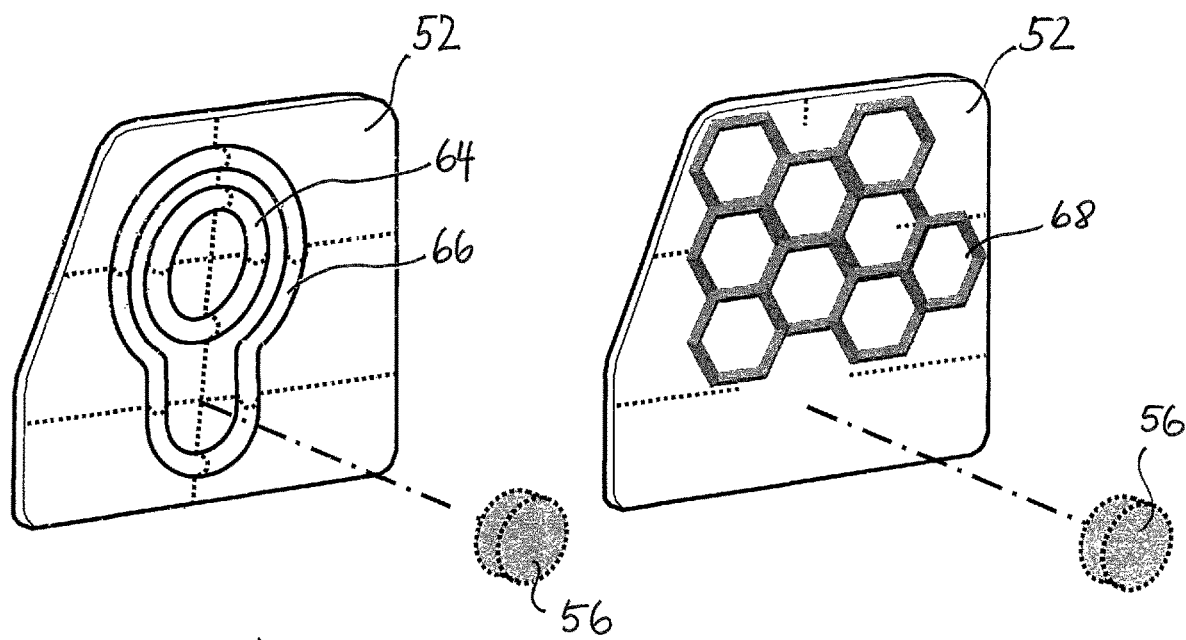
Fig. 4
Fig. 5

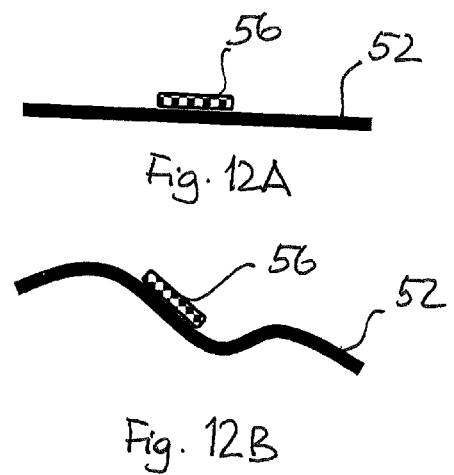
Fig. 12A
Fig. 12B
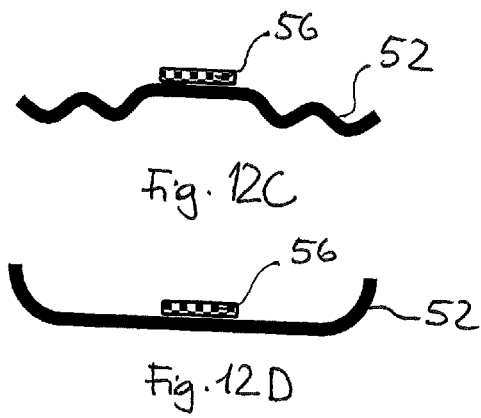
Fig. 12C
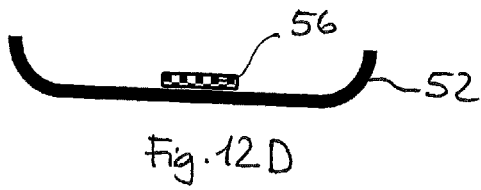
Fig. 12D
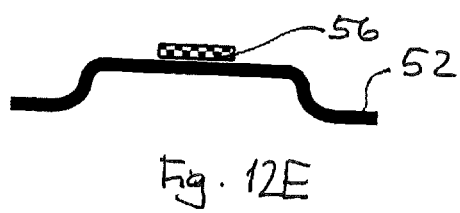
Fig. 12E
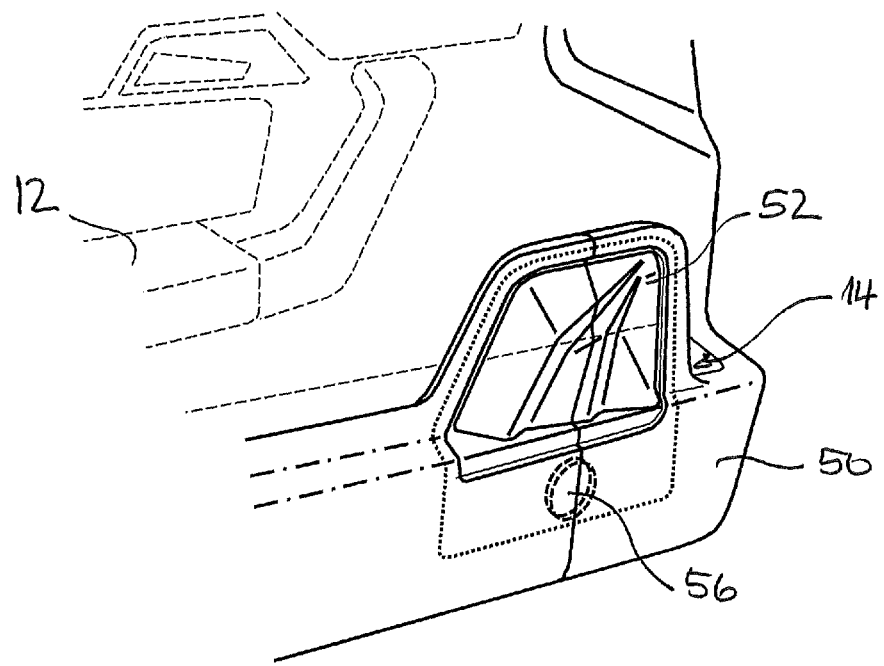
Fig. 13

Vehicle Cabin Interior

Vehicle Cabin Interior

Vehicle Cabin Interior

Vehicle Cabin Interior

INTERIOR COMPONENT OF A VEHICLE

FIELD

The invention relates to an interior component of a vehicle, such as an interior door lining, instrument panel, head liner, center console or floor console.

BACKGROUND

Traditionally, displays, controls and speakers are provided as separate entities in the interior of the vehicle to allow a driver and passengers of the vehicle to control operation of the vehicle and to receive feedback, information and also entertainment directed at the driver and passengers. System integration has advanced and, for example, speakers have been integrated into a headliner or provided over a video display screen designated, as described in U.S. Pat. Nos. 7,050,593 and 7,038,356.

There is a desire to further advanced system integration to reduce parts, decrease weight and space requirements and improve user experience.

SUMMARY

The invention provides an interior component of a vehicle according to claim 1. Different aspects are defined in the dependent claims.

The interior component may be an interior part of a vehicle, such as a door lining, instrument panel, head liner, center console or floor console, a pillar lining, sidewall trim part, a parcel shelf, or the like. The interior component can be a part of different vehicle types, including passenger cars, trucks, trains and aircrafts. The interior component comprises a carrier having a front face directed toward a passenger compartment of the vehicle and an opposite rear face, wherein the carrier may provide structural support to the interior component. The interior component further comprises a speaker including an at least partially transparent diaphragm and a transducer coupled to the diaphragm, wherein movement of the transducer causes vibration of the diaphragm to generate sound by vibration of the diaphragm. The diaphragm has a front face directed towards the passenger compartment and an opposite rear face. The diaphragm may also be referred to as an audio glass and the speaker may be referred to as a screen speaker, glass speaker, or piezoelectric speaker, as detailed further below. According to the invention, the carrier provides a support along at least part of the periphery of the diaphragm where the diaphragm is attached to the carrier and wherein the front face and the rear face of the diaphragm are free off the carrier across a part of the diaphragm surface so that the diaphragm is suspended in the carrier of the interior component. This provides an effect where the diaphragm which generates the sound of the speaker is suspended or appears to be floating in the interior component, with no contact between the carrier and a sound generating portion of the diaphragm surface so that the diaphragm is free to vibrate and generate sound.

Accordingly, the surface of the diaphragm and a surface of the carrier or of vehicle opposite to the diaphragm can be designed to capture, shape and reflect the sound generated at the diaphragm. As a result, the interior component allows tuning and directing the sound generated by the speaker in a way not yet known for conventional speakers or glass speakers used in automotive applications. Additionally, the interior component can be "floating" by design with minimum visible reinforcement or support and with an open space behind the diaphragm. This space may be left free or may include a storage area, for example. The free space behind the diaphragm may be visible behind the clear diaphragm so that the diaphragm may appear as a window within the interior component. In addition an ambient or functional orientation light or a display could be provided behind the clear diaphragm of the speaker, as explained further below.

In one embodiment, the diaphragm is suspended in the interior component by providing an opening in the carrier into which the diaphragm is inserted. Accordingly, neither the front face nor the rear face of the diaphragm is covered by the carrier. In one example, the carrier provides support for the diaphragm along the entire periphery of the diaphragm. In another embodiment, the rear face of the diaphragm may be covered by the carrier at a distance so that the rear face of the diaphragm is spaced from the respective portion of the carrier by a gap. This has the effect that the diaphragm is free to vibrate and emit sound to both the front and the rear thereof, wherein the surface opposite to the rear face of the diaphragm can be designed to capture, shape and reflect the sound. Additionally, this further enhances the floating effect of the speaker within the interior component.

In one example, the perimeter area of the diaphragm is parallel to any mating and adjoining surface and shape of the carrier or its opening, along a mating perimeter edge thereof, with a gap between the diaphragm and any surface opposite to the rear face of the diaphragm. The dimensions of the perimeter edge of the carrier are designed to secure and suspend the diaphragm to allow the diaphragm to freely float and move, vibrate and/or resonate. The dimensions and shape of the diaphragm can influence the performance and sound of the speaker and can be tuned by design. Preferably, the diaphragm should be designed to maintain its dimension over the lifetime of the vehicle.

The carrier may be a single or multi-part and single or multi-layer component, including an optional close out, for example. A close out component may be part of the carrier or a separate part and may be attached to the rear side of the carrier or the diaphragm to provide a shield against light exiting from the rear of the interior component. The diaphragm is attached to the carrier, e.g. using clips, hooks, threaded screws or similar to maintain the designed gap and dimensions. The diaphragm may be attached to the carrier via a gasket or other seal. For example, a sealing foam, such as a double sided sealing foam adhesive tape and/or bonding tape may be preassembled to the carrier or the diaphragm wherein the sealing tape may be provided at the rear side of the carrier around the perimeter of an opening for receiving the diaphragm. The fact that the diaphragm is not directly attached to the carrier but via a seal gasket, for example, enhances the capability of the diaphragm to vibrate and move freely.

In one or more embodiments, one or more transducers are coupled to the diaphragm at a surface portion of the diaphragm where the carrier covers the front face of the diaphragm so as to hide the transducer from being perceived by the passenger of the vehicle. In particular, the transducer may be offset from the center of the diaphragm, e.g. to a lower or upper or sideways ⅓ area of the diaphragm and hidden behind the carrier. Accordingly, the transducer may be arranged at a surface portion of the diaphragm, which is offset from the center of the diaphragm surface towards an edge of the diaphragm and/or the center of the transducer may be arranged at a surface position of the diaphragm which is closer to the edge of the diaphragm surface than to the center of the diaphragm surface. Experiments have shown that this still achieves a remarkably good sound performance. By locating the transducer outside the visible portion of the diaphragm, the clear surface of the diaphragm can be used to illuminate, decorate or add additional design features without the presence of the transducer and associated wiring. The diaphragm also may be provided at the front face of a display such as a digital side view or rear view mirror.

Also the transducer may be attached to the diaphragm by a foam seal gasket, e.g. in a portion of the diaphragm which lies outside of the perimeter of an opening provided in the carrier for exposing the diaphragm.

The transducer may be a piezoelectric exciter including a wire harness and connected or to be connected to a wiring in the interior component. The transducer and the diaphragm in combination, in a preferred embodiment, are part of a piezoelectric speaker which is a loudspeaker that uses the piezoelectric effect for generating sound. The initial mechanical motion is created by applying a voltage to a piezoelectric material, and this motion is converted into audible sound using the diaphragm and optional resonators. Compared to other speaker designs piezoelectric speakers are relatively easy to drive; for example they can be connected directly to TTL outputs, although more complex drivers can give greater sound intensity. The speaker can be designed to operate in a frequency range of, for example, 500 Hz to 20 kHz.

Different speakers designed for different frequency ranges may be located at different positions within interior components of a vehicle. For example, in an upper region of the vehicle, a tweeter or treble speaker can be implemented which is a type of loud speaker designed to generate sound in a higher frequency range, such as 2 kHz to 20 kHz. In a lower region of the vehicle, a bass speaker or woofer design can be implemented which is a type of loud speaker having an additional acoustic chamber designed to generate sound not (only) on the diaphragm but in the resonating chamber in a lower frequency range, such as 500 Hz to 1 kHz. In a middle region of the vehicle, an all-round speaker design can be implemented which can be designed to generate sound in a middle frequency range, such as 1 kHz to 2 kHz.

The transducer may be arranged at a flat surface portion of the diaphragm to assure a reliable and complete transmission of the transducer's motion to the diaphragm. The transducer can be attached to the diaphragm by a foam casket seal, for example. The transducer together with the attachment seal and the associated portion of the diaphragm should both be as flat as possible to have a consistent surface attachment without gaps there between.

During movement of the diaphragm, the diaphragm creates an air pressure wave in front and at the backside of the diaphragm. A forward movement will create a slight overpressure at the front face and a slight under-pressure at the rear face and vice versa. It is therefore an option that the front and backside are acoustically isolated from each other to avoid air pressure cancellation and consequently a serious reduction of the sound output.

In one or more embodiments, the interior component further includes a light source provided at the carrier, behind the carrier, at the diaphragm or behind diaphragm and configured to transmit light through the front face of the diaphragm. This allows achieving a backlighting or edge lighting effect. The speaker diaphragm hence may emit decorative, orientation or environment light, for example. The light source may comprise one or more LEDs, such as SMD LEDs. In another example, the diaphragm may cover a display or a projector, such as a micro, nano or pico projector, to provide information and/or entertainment via the diaphragm.

When the interior component is mounted in the vehicle, a surface of the interior component or another surface of the vehicle is located opposite to the rear face of the diaphragm wherein, in one or more embodiments, a gap is formed between the rear face of the diaphragm and the surface opposite to the rear face. The gap may have a width of at least 50 mm, and a maximum width or distance of about 125 mm. In another example, the width is in the order of 125 mm+/−10% or +/−20%. The gap may be a constant gap on may vary according to design, as explained below.

In one or more embodiments, at least one of the surfaces of the diaphragm and the surface opposite to the rear face of the diaphragm is structured to manipulate sound waves emitted from the diaphragm towards the surface and reflected to the interior vehicle cabin. For example, the at least one surface is structured to selectively resonate, reflect, divert, scatter, direct and/or focus sound waves. Further, the at least one surface may be structured as a sound board.

In general, the diaphragm will be resonating sound both towards an interior cabin and also towards a vehicle trim assembly located behind the rear face of the diaphragm. The vehicle trim dependent on the design and materials, such as carrier and surfaces, will influence the sound by absorbing and muting a portion of the sound and/or by reflecting and amplifying the sound. It is possible to engineer the vehicle trim assembly shape and surface material to influence and improve the sound of the speaker. For example, the surface directly behind and surrounding the diaphragm may be specifically altered for the purpose of improving the sound, e.g. surfaces may be angled to reflect and focus the sound as it bounces off the surface and into the interior cabin.

Design options may include materials and elements that are familiar with the acoustic engineering, modeling and design of Orchestral Music Halls Auditoriums or chambers. The engineering science used may also be implemented for this application and the related interior components.

In some examples, the surface opposite the rear face of the diaphragm may comprise a number of planes that reflect and direct the sound to a specific zone, area or location. The surface of the interior component or another surface opposite to the rear face of the diaphragm should be hard, e.g. formed by injection molding PP or ABS, or could be a back-injected foil, such as from TPO or PVC, or also a laminated foil with or without a soft backing material. With a soft backing material it should be observed that the soft material could possibly absorb part of the sound.

Other surface coverings may include a micro-fiber textile (e.g. Alcantara or ultra suede), or a textile, non-woven or 3D spacer textile—all would absorb or muffle the sound rather than reflect and direct it. Also absorbing surfaces may be specifically designed to tune or balance the reflective surfaces and further improve the sound from the diaphragm.

It should be noted that in common interior components of motor vehicles, all such interior components usually are designed to absorb sound rather than reflect or even enhance and amplify sound. For example, flooring and headliner usually specifically are designed, engineered and made to manage the interior acoustics and dampen engine, road, wind, and vibration noises. The speaker of this invention may be designed as a sub-system and then integrated in the complete vehicle system to assure it meets the acoustic requirements for the entire vehicle wherein acoustic design is not intended at dampening but rather at enhancing and directing sound.

In examples, the at least one surface may be structured to include at least one convex or concave dome shape. For example, the at least one surface is structured to include a plurality of convex and/or concave dome shapes arranged in a pattern. In other examples, the at least one surface is structured to include a plurality of surface portions having different inclination angles relative to a main plane of the diaphragm.

For example, curved surfaces with a parabolic shape have the habit of focusing sound waves to a point. Sound waves reflecting off of parabolic surfaces concentrate all their energy to a single point in space; at that point, the sound is amplified. A parabolic shape can be used for both the diaphragm surface shape as well as the surface behind the diaphragm to allow capturing, shaping and reflecting the sound. For example, surface shapes designed to influence the sound could include parabolic domes that can be arranged in a pattern in relation to the various components within the vehicle cabin, such as seats, floor carpet, and headliner.

Using different designs, the diaphragm may be arranged and/or shaped to generate sound waves having a center of propagation directed at an area within a vehicle cabin which is located in front of and adjacent to a passenger head rest. In particular, the surface of the diaphragm may be positioned or designed to project, radiate and/or focus sound in a particular direction, such as the likely position of the head and ears of the driver or passengers.

The design may be generated with CAE/CAD software— specifically to generating an optimized surface and shape to modify the sound, increase range, direct and focus the sound i.e. within a specific personal passenger zone, e.g. to obtain or prove a high/Tweeter range at a drivers or passengers head/ears, or in combination with other speakers offer individualized audio within a defined zone. The diaphragm may be designed, for example, with the use of a Finite Element Sound Analysis design/engineering software program. For example, the design of the diaphragm and/or the opposite surface can be generated in such a way that sound would not be audible or would be less audible to some vehicle passengers offering a personalized listening experience.

In different examples, the diaphragm is flat, 2.5D shaped or 3D shaped. A 2.5D shape may relate to a shape in which a surface is curved or three-dimensionally shaped in a single direction but flat in other directions/planes, similar to a cylinder or a cylinder section. A minimum bending radius of a curved shape may be in the order of 150 mm. One example of a 2.5 D diaphragm may be glass structure which is flat over a major part of its surface but is curved at the edges or which has a cylindrical shape with the cross section of a partial circle or a parabolic cross-section.

A flat 2D diaphragm would have a general dispersion of sound which is to the cabin interior. For example, the diaphragm surface center may be directed or angled at and facing a driver or passenger. This can be for both mid and high frequency range speaker locations on an interior trim part, such as a door trim part, for example. A shaped 2.5D diaphragm may be angled further to focus and/or manipulate the sound where desired in the interior cabin. A fully 3D shaped diaphragm provides even more options to improve and engineer the sound within the interior. A molded 3D diaphragm may offer further design features with the diaphragm shape that might improve the performance and acoustic effects.

Depending on the manufacturing process of the diaphragm, different bending radii may be provided. In one example, the diaphragm is formed by cold forming glass sheets having a bending radius of at least 150 mm in any region thereof. Either outer glass sheets or the entire multilayer diaphragm may be shaped by cold forming.

In another example, the diaphragm is formed by hot forming glass sheets having a bending radius of at least 15 mm in any region thereof. Bending radii are observed to avoid breaking, shattering or cracking. In still another example, the diaphragm is formed by molding having any desired bending radius wherein clear layers are formed from a polymer material.

In one or more embodiments, the diaphragm may have an overall thickness of between 1 mm and 2 mm, in particular less than 2 mm or about 1.5 mm. Further, the diaphragm may be a multi-layer structure comprising a clear damping layer positioned between to clear outer glass layers. A diaphragm entirely formed by molding from a polymer material may have a larger thickness of up to 4 mm, for example.

In one specific example, the diaphragm comprises a sandwich construction consisting of two approximately 0.5 mm thick tempered sheets of glass that are laminated to a PVB, EVA or another polymer interlayer with the interlayer sandwiched between the two sheets of glass. The interlayer may be provided for bonding, added strength and acoustic dampening properties, for example. Materials of the interlayer may be heat resistant and/or rubber like and may include materials which commonly are used as gaskets, sealants or adhesives, among others. Tempering of the class improves robustness and protects the glass against scratching, acid, humidity, UV radiation, and the like. It also provides protection against cracking or breaking in case of accidents or stroke impact.

Polyvinyl butyral (or PVB) is a resin e.g. used for applications that require strong binding, optical clarity, adhesion to many surfaces, toughness and flexibility. It is prepared from polyvinyl alcohol by reaction with butyraldehyde. Generally, a laminated glass as used in the present invention may comprise a protective interlayer, such as polyvinyl butyral, bonded between two panels of glass. The bonding process may take place under heat and pressure. When laminated under these conditions, the PVB interlayer becomes optically clear and binds the two panes of glass together. Once sealed together, the glass "sandwich", or laminate, behaves as a single unit and looks like normal glass. The polymer interlayer of PVB is tough and ductile, so brittle cracks will not pass from one side of the laminate to the other.

Annealed glass, heat-strengthened or tempered glass can be used to produce laminated glass. While laminated glass will crack if struck with sufficient force, the resulting glass fragments tend to adhere to the interlayer rather than falling free and potentially causing injury.

In practice, the interlayer provides several beneficial properties to laminated glass panes: for example, the interlayer functions to distribute impact forces across a greater area of the glass panes, thus increasing the impact resistance of the glass. Further, the interlayer functions to bind the resulting shards if the glass is ultimately broken. Moreover, the viscoelastic interlayer undergoes plastic deformation during impact and under static loads after impact, absorbing energy and reducing penetration by the impacting object as well as reducing the energy of the impact that is transmitted to impacting object, e.g. a passenger in a car crash. Thus, the benefits of laminated glass include safety and security. Further, experiments have shown that the laminated glass structure is very suitable as a speaker diaphragm.

As an alternative to PVB, ethylene-vinyl acetate (EVA) can be used between two or more layers of glass. The interlayer keeps the layers of glass bonded even when broken, and its high strength prevents the glass from breaking up into large sharp pieces. This produces a characteristic "spider web" cracking pattern when the impact is not enough to completely pierce the glass. In the case of the EVA, thermoset EVA offers a complete bounding (crosslinking) with the material whether it is glass, polycarbonate, PET, or other types products.

Instead of glass, also polymer sheets can be provided, such as draped sheets or vacuum formed polymer sheets or an injection molded transparent shaped component. For example, a polymer diaphragm may be injection molded and shaped in a tool, or formed from a flat plate and heated and vacuum formed in a tool, or heated and draped over a form to create the desired shape. In this case, a polymer interlayer may be omitted.

In any case, the surface of the diaphragm may be made of or coated from UV stabilized PC (polycarbonate), PMMA or other optically clear material. The surface should be designed such that it is resistant to scratching, acid, humidity, UV radiation, and the like.

The thickness of the interlayer and the outer glass layers may vary to achieve an overall thickness of the diaphragm in the range of about 1.8 to 2.2 mm, for example.

As mentioned above, the diaphragm is made of clear material wherein, in a multilayer construction, each of the layers is clear. In the context of this application clear may designate a material fully transparent to light the visible range or a material having a transparency to light in the visible range of between 50 and 100%. In this sense, translucency is considered a superset of transparency. For example, the diaphragm may be formed from glass layers that are clear and may be processed in various transparent color hues, or with additional secondary processes to create a decorative surface. A surface at 100% transparent would be optically clear. By design the transparency can change with the various decorative processes, such as printing, laser or chemical etching. The diaphragm preferably will be semi translucent to allow for a backlight effect or to visually suggest and reveal the space and depth behind the audio glass surface.

In different examples, the carrier is a carrier of a pocket of a door lining, the carrier including a cut out forming a frame for supporting the diaphragm wherein, when mounted, the front face and the rear face of the diaphragm are accessible to a passenger of the vehicle.

In other examples, the carrier is a carrier of a door lining, a center console or a floor console, the carrier defining a sound box having an opening at the front face of the carrier, wherein the diaphragm is arranged at a rear side of the sound box to emit sound through the sound box to the front of the carrier. In this example, when the interior component is mounted in the vehicle, the opening may be located in an area at or below a seat level of a passenger seat in a vehicle cabin.

In further examples, the diaphragm may be part of or cover a digital side view mirror or a digital rearview mirror or may be part of or cover a touch screen. In these examples, the speaker may be located in a door trim upper area, in an instrument panel, floor, center and/or overhead console or a headliner, for example. In a further example, the diaphragm is part of or covers a decorative appliqué.

In one or more embodiments, a pattern may be provided on the front face and/or rear face of the diaphragm, such as a pattern created by printing or etching. Printing may be a 3D printing, screen printing or inkjet printing, for example. Etching may be performed by laser etching, chemical etching or water jet etching. Alternatively or additionally, the diaphragm may be at least partially covered or embedded in an encapsulation material. The patterning of the diaphragm's surface may be provided for the decorative, functional and/or acoustic effects. For example, icons and symbols can be printed on the outer face of the diaphragm to provide indications to a user. In one example, the transducer may be part of the decorative component.

SHORT DESCRIPTION OF DRAWINGS

Figure 2:
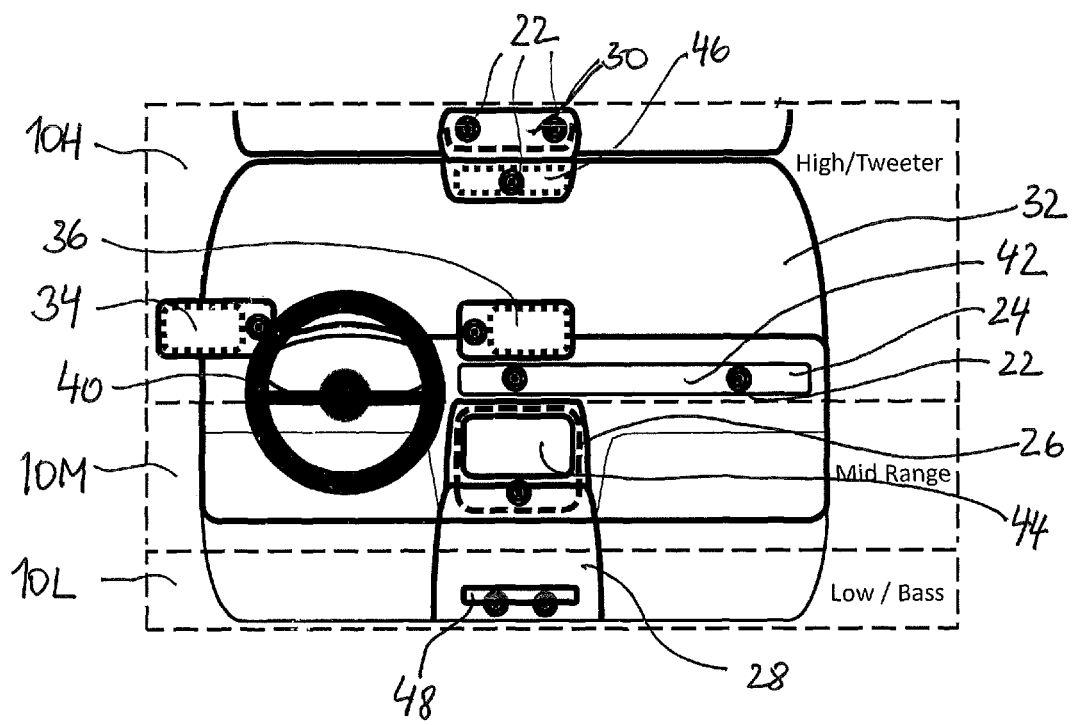
Figure 6:
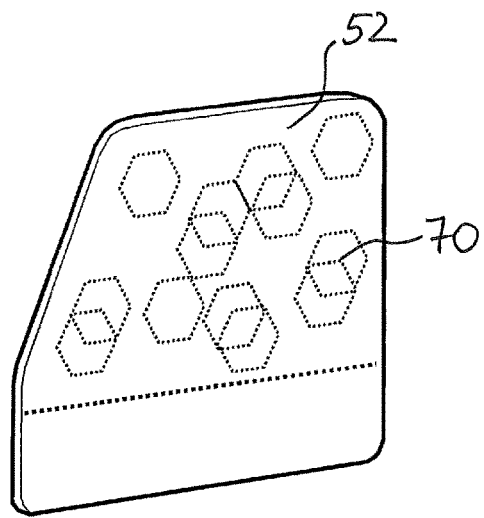
Figures 7A, 7B:
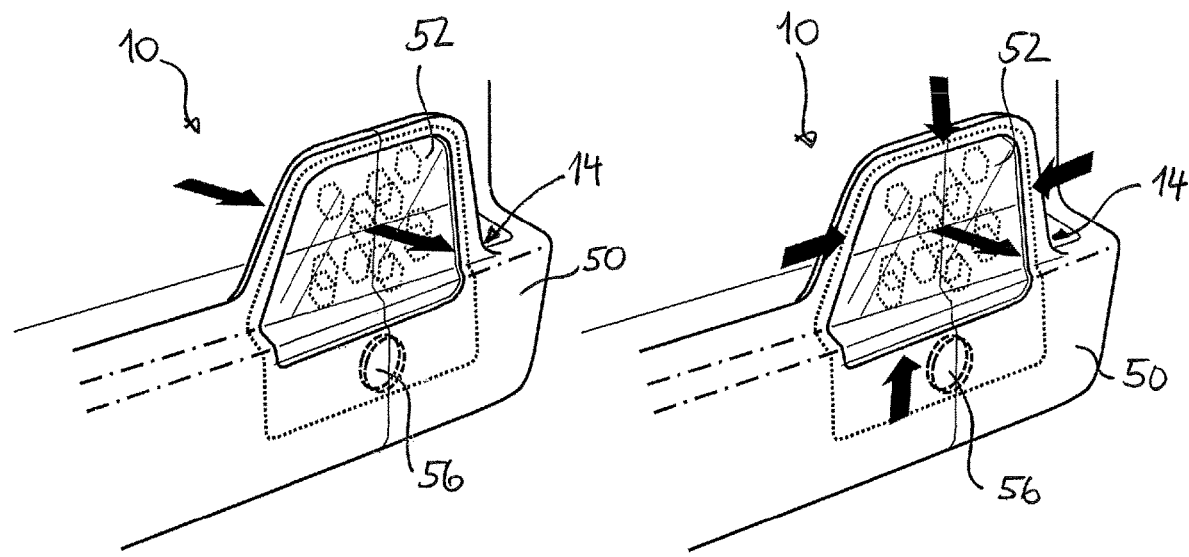
Figure 8:
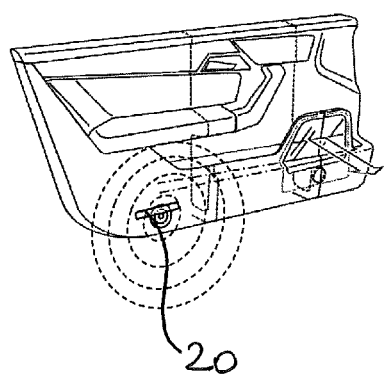
Figure 8:
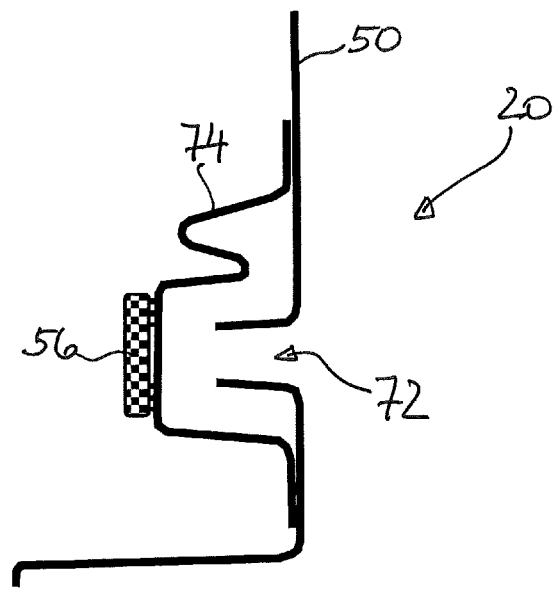
Figure 9:
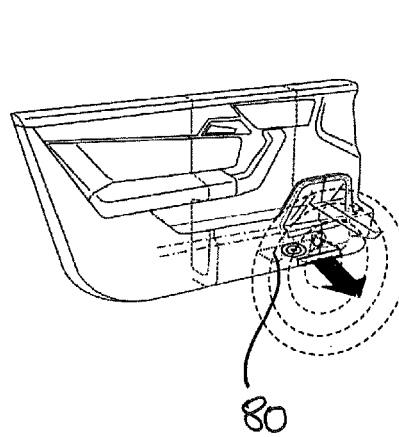
Figure 9:
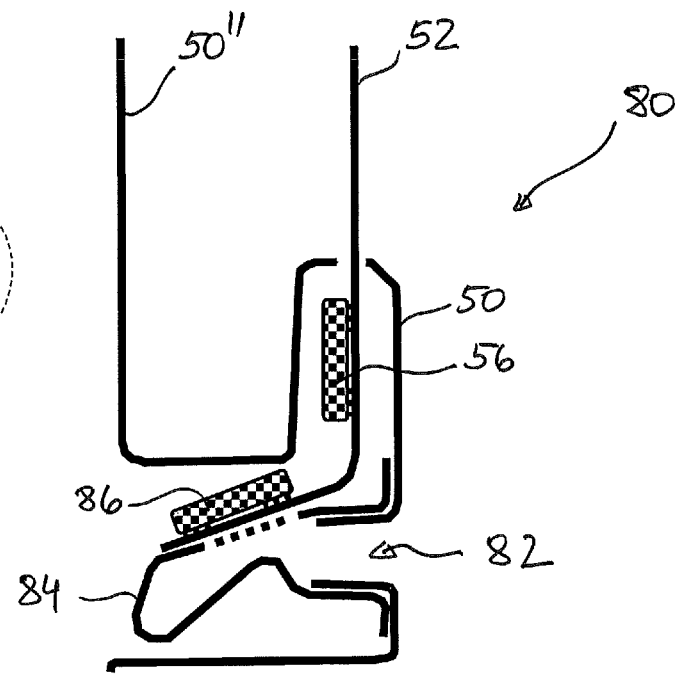
Figures 10A, 10B, 10C:
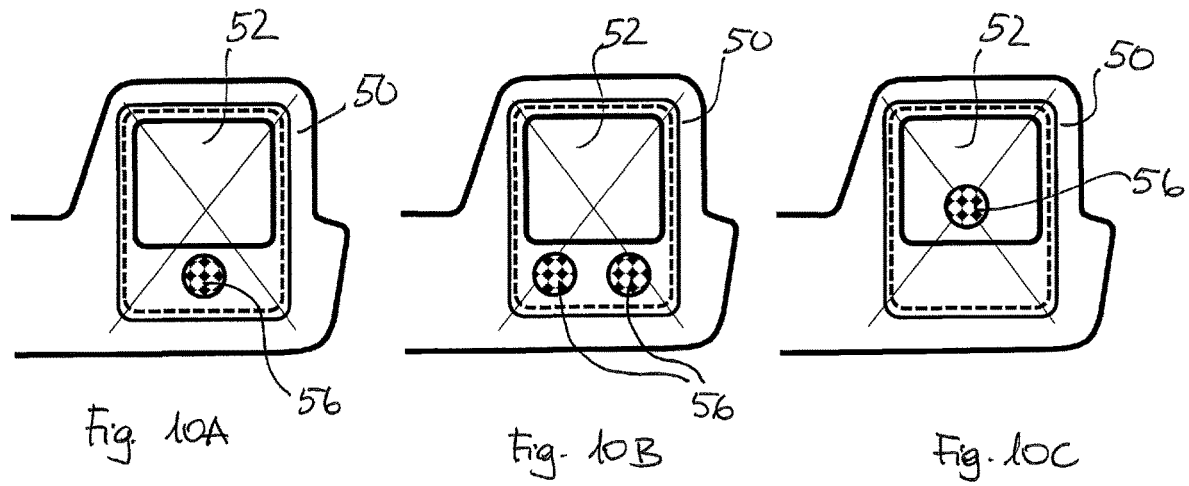
Figures 11A, 11B:
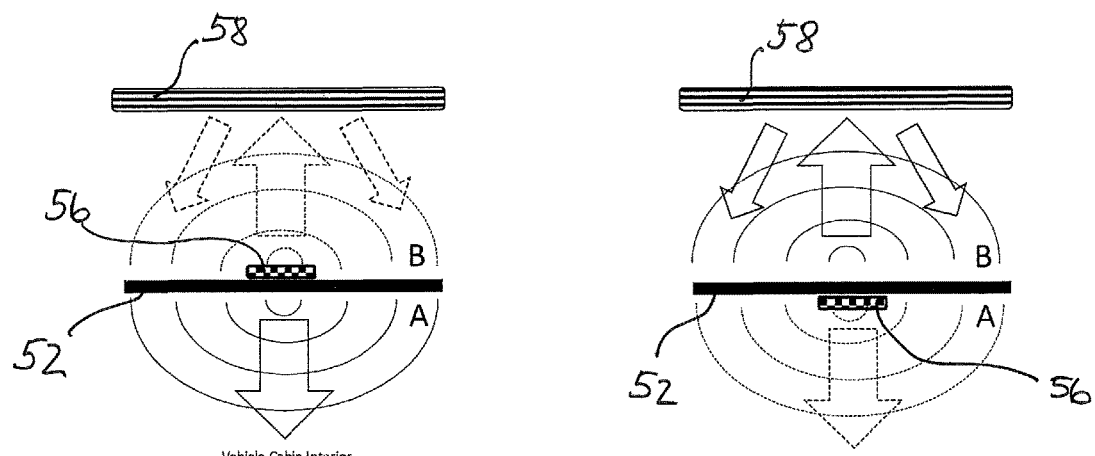
Figure 14A:
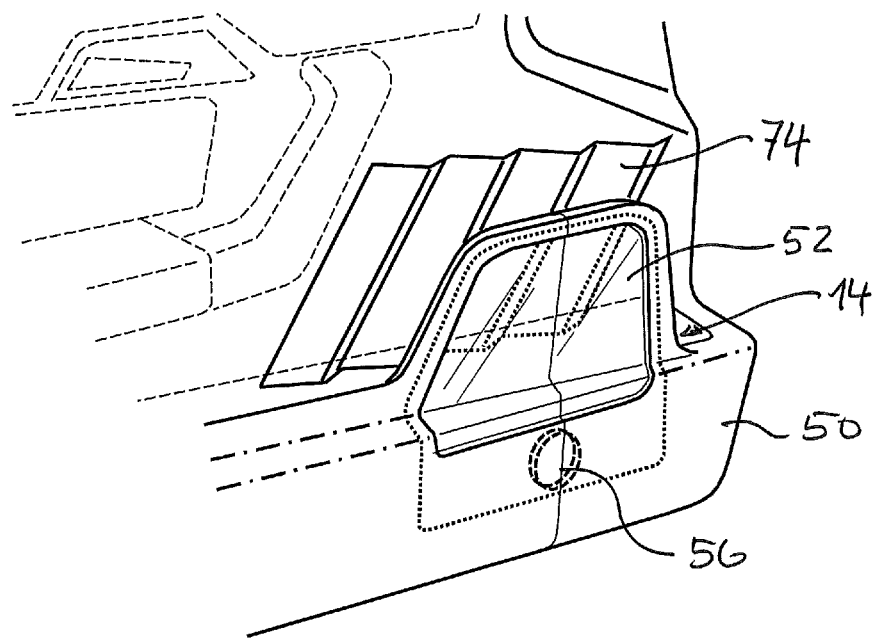
Figure 14B:
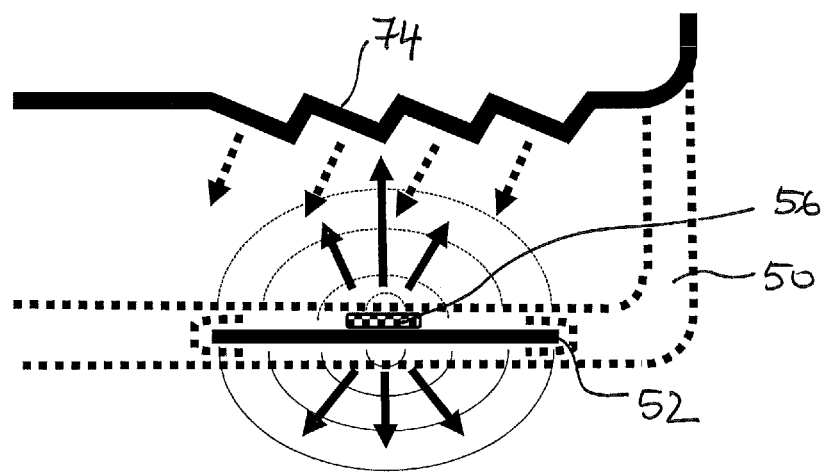
Figure 15A:
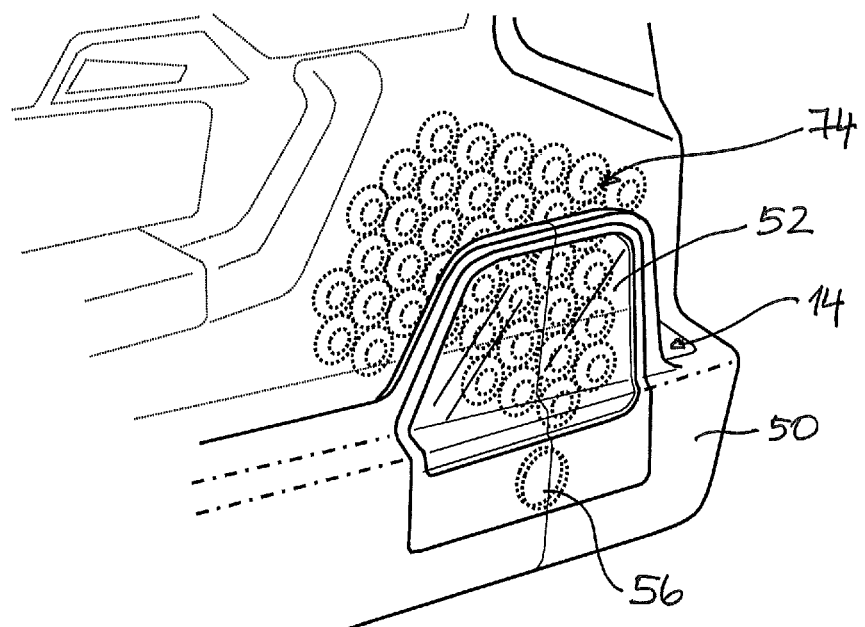
Figure 15B:
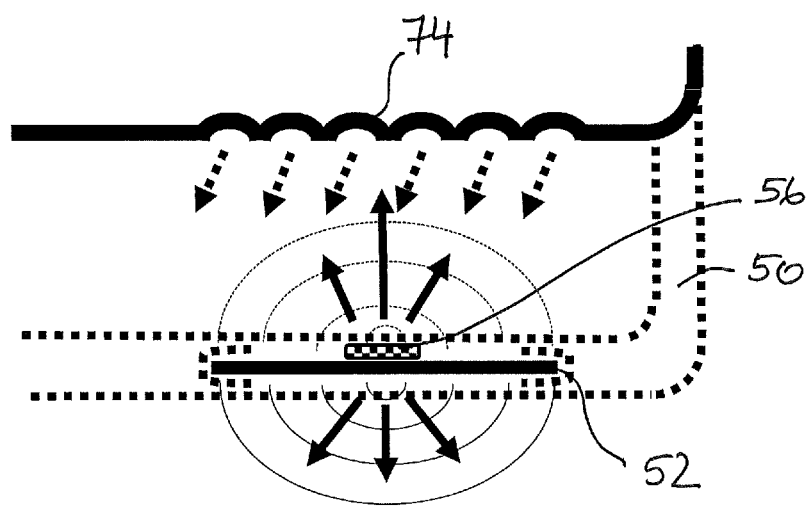
Figure 16A:
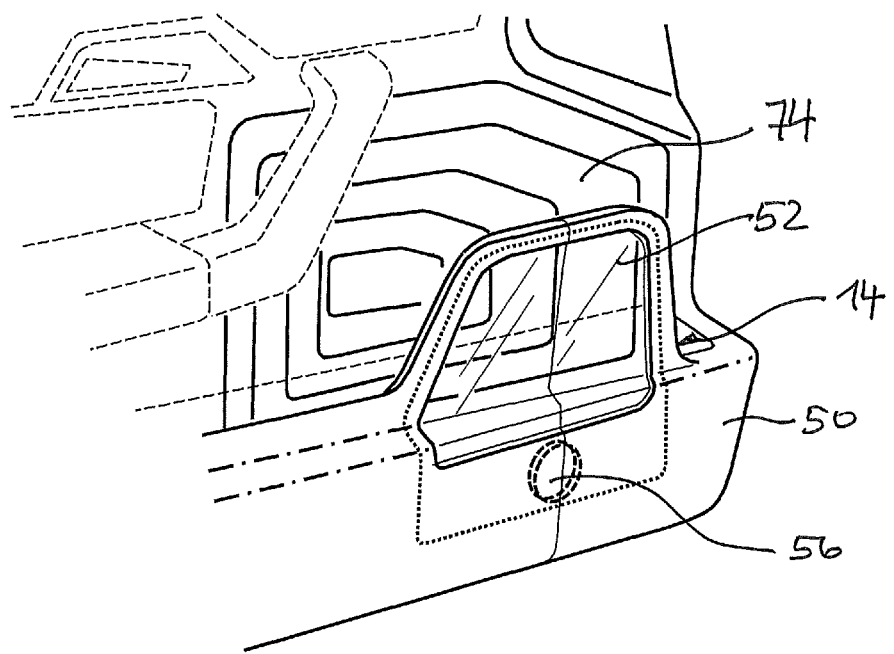
Figure 16B:
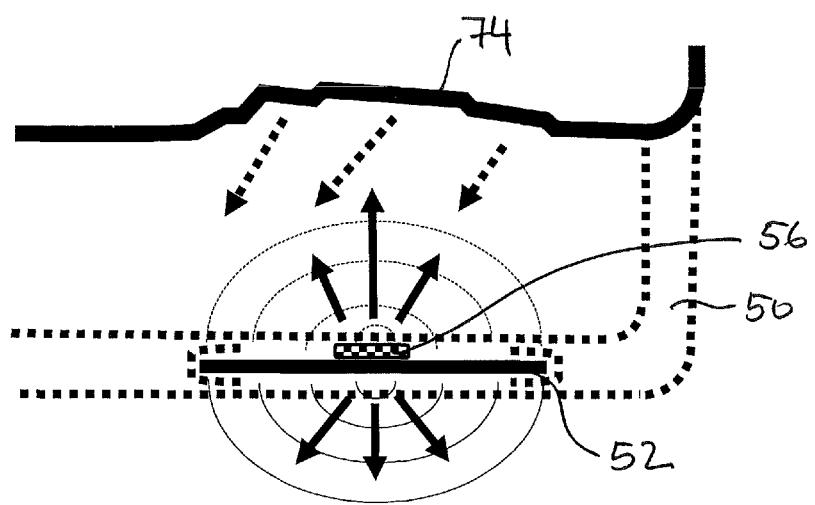
Figure 17A:
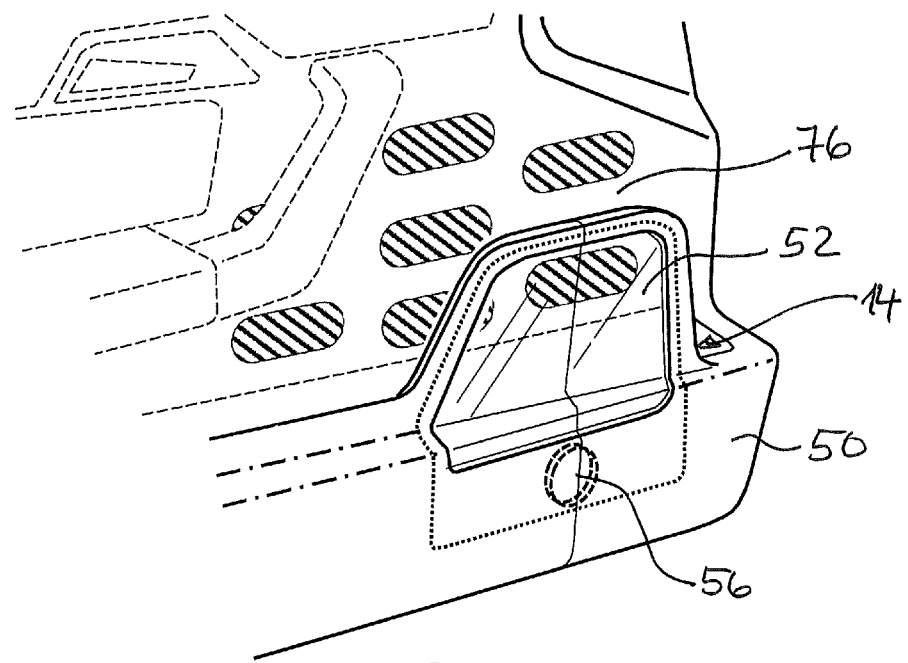
Figure 17B:
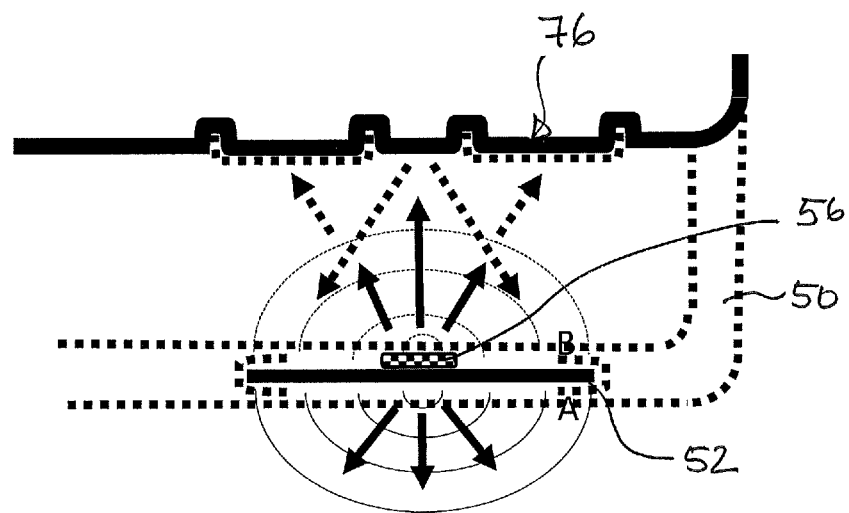

The invention is described with reference to different examples in view of the drawings, wherein:

FIG. 1 schematically illustrates an interior component according to an example;

FIG. 2 schematically illustrates an interior component according to another example;

FIG. 3 schematically illustrates a portion of the interior component of FIG. 1 according to an example, in an exploded view;

FIG. 4 schematically illustrates an example of a speaker which can be used in combination with the interior component of FIG. 1;

FIG. 5 schematically illustrates another example of a speaker which can be used in combination with the interior component of FIG. 1;

FIG. 6 schematically illustrates another example of a speaker which can be used in combination with the interior component of FIG. 1;

FIGS. 7A and 7B schematically illustrate different variants of an interior component using a speaker as shown in FIG. 6, according to different examples;

FIG. 8 schematically illustrates a cross-section through another portion of the interior component of FIG. 1, according to an example;

FIG. 9 schematically illustrates a cross-section through a portion of the interior component, according to another example;

FIG. 10A to 10C schematically illustrate different speaker configurations which can be used in combination with the interior component of FIG. 9, according to different examples;

FIGS. 11A and 11B schematically illustrate different variants of the speaker of FIG. 10A, according to different examples;

FIG. 12A to 12E schematically illustrate different speaker configurations according to different examples;

FIG. 13 schematically shows the interior component of FIG. 3 in an assembled state for illustrating a possible configuration of the diaphragm;

FIGS. 14A and 14B schematically illustrate a variant of the interior component of FIG. 3 in a perspective view and a top sectional view thereof, according to an example;

FIGS. 15A and 15B schematically illustrate a variant of the interior component of FIG. 3 in a perspective view and a top sectional view thereof, according to another example;

FIGS. 16A and 16B schematically illustrate a variant of the interior component of FIG. 3 in a perspective view and a top sectional view thereof, according to another example; and FIGS. 17A and 17B schematically illustrate a variant of the interior component of FIG. 3 in a perspective view and a top sectional view thereof, according to another example.

DESCRIPTION OF EXAMPLES

FIG. 1 schematically illustrates a plan view of an interior component according to an example. In this example, the interior component is a door lining 10 of a front door of a passenger car. The door lining 10 can be considered to be divided in three areas, such as an upper area 10H, a middle area 10M and a lower area 10L. An arm rest 12 and a map pocket 14 are arranged in the middle area 10M. A decorative appliqué 16 and a digital side view mirror 18 are arranged in the upper area 10H. An acoustic structure 12 is arranged in the lower area 10L. In this example, each of the map pocket 14, the decorative appliqué 16, the digital side view mirror 18, and the acoustic structure 20 include a speaker of an interior component according to the invention. In other examples, more or less speaker units can be provided. Further, in the present example, speakers integrated in the decorative appliqué 16 and the digital side view mirror 18 in the upper area 10H may be implemented to provide a speaker for higher frequency range sound, such as a Tweeter; a speaker integrated in the map pocket 14 in the middle area 10M may be implemented to provide a speaker for middle frequency range sound; and a speaker integrated in the acoustic structure 20 in the lower area 10L may be implemented to provide a speaker for lower frequency range sound, such as a bass speaker or woofer. In other examples, a different distribution of speakers may be provided.

As illustrated in further detail below, each of the speakers includes an at least partially transparent diaphragm and at least one transducer 22 coupled to the respective diaphragm. Movement of the transducer causes vibration of the diaphragm to generate sound. An example of the transducer 22 is a piezo actuator.

FIG. 2 schematically illustrates another part of an interior cabin of the vehicle, including different interior components, such as an instrument panel 24, a center console 26, a floor console 28, and an overhead console 30, with a windshield 32 between the instrument panel 24 and the overhead console 30. Also in this example, the interior cabin can be divided in three areas, such as an upper area 10H, a middle area 10M and a lower area 10L. The instrument panel 24 and the center console 26 are arranged in the middle area 10M. The overhead console 30 is arranged in the upper area 10H. And the floor console 28 is arranged the lower area 10L.

In this example, two digital side view mirrors 34, 36 are arranged at the instrument panel 24, to the left and to the right of a steering wheel 40. Further, a decorative appliqué 42 is also arranged at the instrument panel 24. An infotainment center including a display screen 44 is arranged at the center console 26. A digital rear view mirror 46 is arranged at the overhead console 30. An acoustic structure 48 is arranged at the floor console 28.

Each of the interior components 34 to 48 includes a speaker of an interior component according to the invention. In other examples, more or less interior components having a speaker can be provided. Further, in the present example, a speaker integrated the interior components 34, 36, 42, 46 in the upper area 10H may be implemented to generate higher frequency range sound, such as a Tweeter; a speaker integrated in an interior component 44, such as an infotainment center, in the middle area 10M may be implemented to generate middle frequency range sound; and a speaker integrated in the interior component 48 in the lower area 10L may be implemented to generate lower frequency range sound, such as a bass speaker. In other examples, a different distribution of speakers may be provided.

As illustrated in further detail below, each of the speakers includes an at least partially transparent diaphragm and at least one transducer 22 coupled to the respective diaphragm. Movement of the transducer causes vibration of the diaphragm to generate sound. (For the sake of clarity, in FIGS. 1 and 2, not each of the transducers is identified by reference number 22.) An example of the transducer 22 is a piezo actuator.

FIG. 3 schematically illustrates a portion of the interior component of FIG. 1 according to an example, in an exploded view. In this example, the interior component 10 is an interior door lining, more specifically, a map pocket portion thereof. The interior component 10 comprises a carrier 50 which, in this example, is shaped to form a map pocket, a diaphragm 52 and a transducer 56 which form part of a speaker integrated into the interior component 10, and a frame 58 for supporting and attaching the interior component 10 to the vehicle. The diaphragm 52 may be attached to a rear face of the carrier 50 with a seal 60 provided between the front face of the diaphragm 52 and the rear face carrier 50. A rear face of the diaphragm 52 may be attached to the frame 58, with another seal 62 provided between the diaphragm 52 and the front face of frame 58.

The carrier 50 forming the map pocket may be formed from a fiber reinforced substrate, including synthetic and/or natural fibers and may further be provided with a decorative cover layer, as generally known for interior components in automotive applications. A sealing foam bonding tape 60 may be preassembled to the rear face of the carrier 50 around an opening perimeter 50' into which the speaker diaphragm 52 is to be inserted. The diaphragm 52 is located at the opening 50' and can be attached to the carrier 50 by press fitting the sealing tape 16.

The diaphragm 52 may be flat or formed to have 2.5D or 3D shapes, as explained above. It may be made from glass and, in a particular example, may include a sandwich construction consisting of two about 0.5 mm thick tempered sheets of glass laminated to a PVP, or EVA, for example. The middle layer is provided for bonding, added strength and may effect acoustic properties and is sandwiched between the two glass sheets. The dimensions of the middle layer may vary around a thickness of about 0.6 mm, and the overall thickness of the entire diaphragm may be in the range of about 1.8 to 2.2 mm. The outside perimeter of the diaphragm may vary in shape according to the interior component where the speaker is to be located.

The surface of the diaphragm 52 may include decorative elements which may include individually or in combination graphic elements formed by printing, such as screen printing, digital inkjet printing, rolled printing and laser and/or chemical etching on either or both of the front face and the rear face of the diaphragm 52. Additive surface decoration and treatments may be provided, including over molding polymer in an injection molding process, 3D printing a polymer design directly onto a treated glass surface; 3D printing glass design over a treated glass surface, wherein such additive surface decoration also may be provided separately from the diaphragm, at a small distance of e.g. 2.0 mm, as to not interfere with the speaker function of the diaphragm.

The transducer 56, such as a piezo transducer or exciter is located at a position on the diaphragm 52 where the diaphragm is perfectly flat and, preferably, where the transducer cannot be perceived by the passage of the vehicle, e.g. because it is hidden by the carrier 50. The transducer 56 may be attached to a flat surface area of the diaphragm 52 via a bonding foam casket seal, with the transducer 56 press fitted to the flat area to be attached thereto. Whereas the transducer 56 could be located in the center of the diaphragm 52, which one may assume would be necessary for achieving optimal acoustic results, experiments have shown that an attachment of the transducer 56 closer to an edge of the diaphragm achieves remarkably good sound performance. In the example, the transducer 56 is attached in a lower third area of the diaphragm. In other examples, the transducer may be offset from the center of the diaphragm towards any edge to be located somewhere between the center and the edge of the diaphragm, e.g. in an outer third or outer quarter area of the diaphragm, to locate the transducer in an area which may be easily hidden by the carrier. This provides a clear and unobstructed surface of the diaphragm which, in addition to providing the speaker function, can be illuminated, used as a display, decorated or provided with additional design features without the perceivable presence of the transducer and associated wiring.

In the example illustrated in FIG. 3, the diaphragm 52 of the speaker will appear to be floating within the carrier 50, with the diaphragm 52 being fully transparent and both the front surface and the rear surface of the diaphragm accessible to a passenger. In this example, the speaker diaphragm forms part of the map pocket.

At the rear of the interior component 10, the frame 58 may provide a closeout and/or attachment component for attaching the interior component to the door panel or another vehicle part. The diaphragm 52 may be attached to the frame 58 by a sealing foam bonding tape 62. Additional or alternative fasting means, such as clips or fasteners, may be provided to join the entire construction including the carrier 50, diaphragm 52, frame 58 and associated seals 60, 62. The transducer 52 may be connected to a control unit (not shown), such as a vehicle ECU, via a wire harness (not shown) to be connected to a door wiring harness (also not shown).

As explained above and as further illustrated below, the diaphragm 52 and/or the frame/close out 58 or another surface opposite the rear face of the diaphragm may be shaped to tune the sound produced by the speaker. FIGS. 4, 5, and 6 schematically illustrate different examples of a diaphragm which may be used as the diaphragm 52 in the example of FIG. 3.

In the example of FIG. 4, a circular acoustic pattern 64 is formed on the diaphragm surface, e.g. by printing, etching or over molding to direct sound generated by the diaphragm. The transducer 56 is integrated within the pattern 64 to control and direct the vibration generated by the transducer 56 towards the center of that portion of the diaphragm which is exposed through the opening 50' of the carrier 50. For example, the circular pattern 64 has a center which coincides at least approximately with the center of the exposed surface portion of the diaphragm to evenly radiate sound waves from the center, and the transducer 56 is integrated into the circular pattern by a respective extension 66 enclosing the transducer 56. The surface shape is such that it gives "shape" to the sound waves.

In the example of FIG. 5, a honeycomb acoustic pattern 68 is formed on the diaphragm surface by an additive process, such as over molding, 3D printing and injection molding. Also the honeycomb pattern can have the effect to evenly radiate acoustic waves from the exposed portion of the diaphragm. The transducer 56 is located in a lower third and perfectly flat area of the diaphragm.

In the example of FIG. 6, a graphic pattern 70 is provided on the diaphragm surface, such as by printing or laser etching. This pattern does not have an acoustic effect but may be provided for decoration or providing information to a passenger.

FIGS. 7A and 7B illustrate different lighting scenarios of an interior component using the diaphragm shown in FIG. 6 in a configuration as shown in FIG. 3, according to different examples. The same components as in the previous drawings are designated by the same reference numbers. FIGS. 7A and 7B allow well recognizing the map pocket 14 which is defined by the carrier 50, including the diaphragm 52 of the speaker. The diaphragm 52 is clear or transparent, having a light transmittance to visible light of at least 70%, for example. The diaphragm further may function as a light guide.

In the example of FIG. 7A, a light source (not shown) may be provided behind the diaphragm 52 at a location spaced from the diaphragm, e.g. at a rear wall of the map pocket carrier, to generate light which is transmitted through the diaphragm 52, from back to front, to provide an illuminated decorative surface and/or a display surface. In the example of FIG. 7B, a light source (not shown) may be provided in or at the carrier 50 around an edge of the diaphragm 52 to feed light through the edge of the diaphragm to the diaphragm surface from where it is emitted. The light source may be an LED light source or projector and, in case of FIG. 7B, in particular, may be an SMD LED light source, for example. One or more LEDs may be provided at different locations.

FIG. 8 schematically shows a cross-section through another portion of the interior door lining shown in FIG. 1, i.e. through the acoustic structure 20 in the lower area 10L. The little sketch at the left-hand side of FIG. 8 illustrates where this sound structure 20 may be located. The acoustic structure 20 of this example will be perceived by a passenger of the vehicle as an opening 72 within the carrier 50. The acoustic structure 20 comprises a cavity defined between the carrier 50 and an enclosure 74 which generates the effect of a sound box, with a transducer 56 being attached and acoustically coupled to a flat rear surface portion of the enclosure 74. The enclosure may have a diaphragm integrated therein. The acoustic structure 20 may be a separate entity supplementing the audio glass speaker. A sound box is known as an open chamber in the body of a musical instrument which modifies the sound of the instrument, and helps transfer that sound to the surrounding air. The cavity formed between the carrier 50 and the enclosure 74 hence may be compared to the body of a musical instrument. The frequency and strength of the resonances of the body will have a impact on the tone quality which the acoustic structure 20 produces. The air inside the cavity has its own resonances. As a sound box typically adds resonances at lower frequencies, the acoustic structure 20 is particularly adapted to generate sound in the lower frequency ranges.

FIG. 9 schematically shows a cross-section through another portion of the interior component according to an example which may be a modification of the interior component shown in FIG. 1, with an additional sound structure 80 located below the speaker integrated into the map pocket 14 which has been described with reference to FIGS. 7A and 7B. The little sketch at the left-hand side of FIG. 9 illustrates where this additional sound structure 80 may be located. The same reference numbers as in the previous drawings are used to designate the same components. In particular, FIG. 9 shows the carrier 50 defining the map pocket, with the diaphragm 52 integrated into the carrier opening 50' and the transducer 56 located in the lower portion of the diaphragm surface, hidden from view by the carrier 50. FIG. 9 also illustrates a rear wall 50" of the carrier, with the map pocket being defined, in part, between the rear wall 50" and the diaphragm 52. Further, FIG. 9 illustrates how the diaphragm 52 may be connected with and supported by the carrier 50.

Also in the modification of FIG. 9, the acoustic structure 80 will be perceived by a passenger of the vehicle as an opening 82 within the carrier 50. The acoustic structure 20 comprises a cavity defined between the carrier 50 and an enclosure 84 which creates the effect of a sound box. In this example, the diaphragm 52 is extended to contact the rear surface of the enclosure 84 where a second transducer 86 is attached to the rear surface of the diaphragm 52. Accordingly, a speaker is provided which generates sound in the middle frequency range at the portion of the diaphragm 52 exposed through the opening 50' within the carrier, this sound mainly generated by the first transducer 56, and which further generates sound in the lower frequency ranges at the portion of the diaphragm extending to and contacting the rear face of the enclosure 84 of the cavity, with the lower frequency sound mainly generated by the second transducer 86. The enclosure 84 has an opening and/or perforations in the area of the contacting diaphragm 52 and transducer 86 to allow sound entering into the cavity to generate the sound box effect, similar as described above.

At each of the diaphragms, one or more transducers can be located at different positions, as illustrated for the acoustic structures 20, 48 and the rearview mirror 46 shown in FIGS. 1 and 2. It is understood that the exact shape and configuration of diaphragm and number and location of transducers are examples only. By way of example, different transducer locations for the diaphragm 52 of the map pocket interior component are illustrated in FIGS. 10A, 10B and 10C. The same reference numbers as in the previous drawings are used for designating the same components, wherein reference is made to the above description. As shown, one or more transducers may be located e.g. in the lower third area of the diaphragm 52 wherein a transducer 50 also may be located in the center of the diaphragm and may be exposed through the opening 50'. Moreover, in some embodiments, the transducer also can be a functional design element. For example, the transducer can be integrated into a graphic or pattern provided on the diaphragm.

With reference to the example of FIG. 10A, FIGS. 11A and 11B schematically illustrate examples of sound propagation of a speaker having a diaphragm and a transducer which may be attached to the rear surface of the diaphragm (FIG. 11A) or to the front surface of the diaphragm (FIG. 11B). As illustrated, in the example of FIG. 11A, sound is directly emitted from the front surface of the diagram 52 with only a small portion of the sound being emitted from the rear surface of the diaphragm 52 towards the frame 58 or a rear wall of the interior component or any other surface opposite to the rear surface of the diaphragm and reflected therefrom. In the example of FIG. 11B, the major part of the sound is emitted from the rear surface of the diagram 52 towards any opposite surface, with only a small portion of the sound being emitted to the front surface of the diaphragm 52. Sound emitted from the rear surface of the diaphragm 52 will be reflected from any other surface opposite to the rear surface of the diaphragm and reflected therefrom.

As indicated, the surface of the diaphragm and/or the surface opposite to the rear surface of the diaphragm 52 may be structured to shape the sound, such as direct, focus or concentrate sound to any desired position, e.g. to a position near a head position of the driver or passenger, or to scatter or distribute sound within the passenger cabin as desired.

FIG. 12A to 12E schematically illustrate cross-sectional views of diaphragms having different shapes, according to various examples. Each diaphragm 52 is associated with a transducer 56 which is arranged in a flat area portion of the diaphragm, e.g. at the rear face of the diaphragm 52.

In the example of FIG. 12A, the diaphragm 52 has a perfectly flat surface and is from a flat multilayer glass sheet or single polymer sheet, as explained above. The diaphragm 52 may have any arbitrary and suitable perimeter contour.

In the example of FIG. 12B, the diaphragm 52 has a curved surface which may be any geometric 2.5D shaped in one cross-sectional direction and is flat in a direction perpendicular thereto. The diaphragm may be from a multilayer glass sheet or single polymer sheet, as explained above. The shape of the diaphragm may be obtained by cold forming or hot forming or injection molding, depending on the desired bending radii, and the structure and manufacturing technology of the diaphragm. The diaphragm 52 may have any arbitrary and suitable perimeter contour.

Similar to the example of FIG. 12B, in the example of FIG. 12C, the diaphragm 52 has a rippled or wave surface which may be 2.5D shaped in one cross-sectional direction and flat in a direction perpendicular thereto. A center flat area is provided for attachment of the transducer 56. The diaphragm may be from a multilayer glass sheet or single polymer sheet, as explained above. The shape of the diaphragm may be obtained by cold forming or hot forming or injection molding, depending on the desired bending radii, and the structure and manufacturing technology of the diaphragm. The diaphragm 52 may have any arbitrary and suitable perimeter contour.

In the examples of FIGS. 12D and 12E, the diaphragm 52 has a convex curved surface and a concave curved surface, respectively, which may be 2.5D shaped or 3D shaped, with a flat surface portion for attachment of the transducer 56. The diaphragm may be from a multilayer glass sheet or single polymer sheet, as explained above. The shape of the diaphragm may be obtained by cold forming or hot forming or injection molding, depending on the desired bending radii, and the structure and manufacturing technology of the diaphragm. The diaphragm 52 may have any arbitrary and suitable perimeter contour.

The shape of the diaphragm may be adapted to the particular application of the interior component, and the intended acoustic effect. The shape and orientation of the diaphragm in the interior component can be adjusted to manipulate sound waves emitted from the diaphragm towards surface, in particular to selectively resonate, reflect, divert, scatter, direct and/or focus sound waves.

FIG. 13 shows a schematic perspective view of the interior component of FIG. 3, illustrating the diaphragm 52 which has a structured surface to manipulate the sound waves emitted from the diaphragm to the interior of the vehicle cabin. In this example, the diaphragm surface is provided with a number of differently inclined surface portions relative to a general plane of the diaphragm 52. By adjusting the inclination, sound can be direct to different areas within the interior of a vehicle cabin. The same components as in the previous examples are designated by the same reference numbers. Reference is made to the above description.

FIGS. 14A and 14B show a schematic perspective view and a sectional view from above of a variant of the interior component of FIG. 3, illustrating a diaphragm 52 having a flat surface in combination with a structured back wall 74 of the interior component to manipulate the sound waves emitted from the diaphragm to the back wall and reflected to the interior of the vehicle cabin. In this example, the structured back wall 74 has a stepped configuration, with a plurality of surfaces portions which are inclined relative to a general plane of the diaphragm 52. By adjusting the inclination, sound can be direct to different areas within the interior of a vehicle cabin. A possible sound effect is schematically illustrated in the 14B. The structured back wall 74 may be an integral part of the interior component 50, such as rear wall of the map pocket, or may be a separate sound manipulating component, such as sound board attached to any surface opposite the rear face of the diaphragm 52. The same components as in the previous examples are designated by the same reference numbers. Reference is made to the above description.

FIG. 14B schematically illustrates how sound is generated by the diaphragm 52. When excited by the transducer 56, sound is emitted directly from the diaphragm 52 surface into the interior of the vehicle cabin and is further emitted from rear face of the diaphragm 52 towards the structured back wall 74 and reflected therefrom. As shown in FIG. 14B, sound generally propagates in circles around the transducer 56 and can be redirected by the structured back wall 74. Further, the structured back wall 74 may function as sound board and resonate and amplify the reflected sound in a particular frequency range.

FIGS. 15A and 15B show a schematic perspective view and a sectional view from above of another variant of the interior component of FIG. 3, illustrating a diaphragm 52 having a flat surface in combination with a structured back wall 74 of the interior component to manipulate the sound waves emitted from the diaphragm towards the back wall and reflected to the interior of the vehicle cabin. In this example, the structured back wall 74 has a surface configuration including a plurality of parabolic or micro parabolic shapes which may be convex and/or concave to reflect and focus and/or divert sound waves. The structured back wall 74 may be an integral part of the interior component 50, such as rear wall of the map pocket, or may be a separate sound manipulating component attached to any surface opposite the rear face of the diaphragm 52. By adjusting the size, depth or height, curvature, number, pattern and density of the parabolic shapes sound can be manipulated in different ways, reflected to different areas within the interior of the vehicle cabin, focused, scattered or otherwise emitted into the interior of the vehicle cabin. The same components as in the previous examples are designated by the same reference numbers. Reference is made to the above description.

A possible sound effect is schematically illustrated in FIG. 15B, wherein reference is made to the description of the sound effect illustrated in FIG. 14B. Further variations of acoustic effects may be obtained by combining parabolic structures of different sizes, combining convex and concave shapes, combining three-dimensional structures of different shapes, and/or adjusting patterns in which these structures are arranged.

In a further variation, it also is possible to provide a structured back wall 74 which includes a single convex or concave parabolic shape or dome shape to reflect and direct sound. The dome could be continuous or stepped, for example. A respective example of a single stepped parabolically shaped back wall and the associated sound effect are illustrated in FIGS. 16A and 16B. The same components as in the previous examples are designated by the same reference numbers. Reference is made to the above description.

FIGS. 17A and 17B show a schematic perspective view and a sectional view from above of another variant of the interior component of FIG. 3, illustrating a diaphragm 52 having a flat surface in combination with a structured back wall 76 of the interior component to manipulate the sound waves emitted from the diaphragm towards the back wall and reflected to the interior of the vehicle cabin. In this example, the structured back wall 76 has a substantially flat surface, including areas of different surface material, such as sound reflecting material and sound absorbing material to balance and tune the sound emitted into the interior vehicle cabin. For example, a relatively smooth and hard material can be combined with a softer and/or roughened surface material. Different materials, such as plastic, wood, glass, paper, fibrous material, different fabrics, carpet material, foams, multilayer material, etc. can be combined. Further, different surface materials can be combined with different three-dimensional structures, such as the ones described above, for example.

The structured back wall 76 may be an integral part of the interior component 50, such as a rear wall of the map pocket, or may be a separate sound manipulating component, such as a sound board attached to any surface opposite the rear face of the diaphragm 52. By adjusting the shape, size, number, pattern and density of the different material patches, sound can be manipulated in different ways, reflected to different areas within the interior of the vehicle cabin, focused, scattered or otherwise balanced and tuned. The same components as in the previous examples are designated by the same reference numbers. Reference is made to the above description.

A possible sound effect is schematically illustrated in FIG. 17B, wherein reference is made to the description of the sound effect illustrated FIG. 14B.

The invention claimed is:

1. An interior component of a vehicle, the interior component comprising:
   a carrier having a front face directed toward a passenger compartment of the vehicle and an opposite rear face;
   a speaker including an at least partially transparent diaphragm and a transducer coupled to the diaphragm, wherein movement of the transducer causes vibration of the diaphragm to generate sound by vibration of the diaphragm, the diaphragm having a front face directed towards the passenger compartment and an opposite rear face;
   wherein the carrier provides a support along at least part of a periphery of the diaphragm where the diaphragm is attached to the carrier wherein the front face and the rear face of the diaphragm are free of the carrier across a part of a diaphragm surface so that the diaphragm is suspended in the carrier of the interior component, and
   wherein the transparent diaphragm comprises two sheets of annealed or tempered glass and a polymer interlayer between the glass sheets.

2. The interior component of claim 1, wherein the diaphragm is suspended in the interior component by providing in the carrier open spaces at the front face and the rear face of the diaphragm.

3. The interior component of claim 1, wherein the carrier provides support along an entire periphery of the diaphragm.

4. The interior component of claim 1, wherein the transducer is coupled to the diaphragm at a surface portion of the diaphragm where the carrier covers the front face of the diaphragm.

5. The interior component of claim 1, further including a light source provided at the carrier, behind the carrier, at the diaphragm or behind the diaphragm and configured to transmit light to the front face of the diaphragm.

6. The interior component of claim 1, further including a surface opposite to the rear face of the diaphragm wherein a gap is formed between the rear face of the diaphragm and the surface opposite to the rear face.

7. The interior component of claim 6, wherein the gap has a width of at least 50 mm.

8. The interior component of claim 1, wherein at least one of the surface of the diaphragm and a surface opposite to the rear face of the diaphragm is structured to manipulate sound waves emitted from the diaphragm towards surface.

9. The interior component of claim 8, wherein the at least one surface is structured to selectively resonate, reflect, divert, scatter, direct and/or focus sound waves.

10. The interior component of claim 8, wherein the at least one surface is structured as a sound board.

11. The interior component of claim 8, wherein the at least one surface is structured to include at least one convex or concave dome shape.

12. The interior component of claim 8, wherein the at least one surface is structured to include a plurality of convex and/or concave dome shapes arranged in a pattern.

13. The interior component of claim 8, wherein the at least one surface is structured to include a plurality of surface portions having different inclination angles relative to a main plane of the diaphragm.

14. The interior component of claim 1, wherein the diaphragm is arranged and/or shaped to generate sound waves having a center of propagation directed at an area within a vehicle cabin which is located in front of and adjacent to a passenger head rest.

15. The interior component of claim 1, wherein the diaphragm is 2.5D or 3D shaped.

16. The interior component of claim 1, wherein the diaphragm has an overall thickness of between 1 mm and 2 mm.

17. The interior component of claim 1, wherein the carrier is a carrier of a pocket of a door lining, the carrier including a cut out forming a frame for supporting the diaphragm wherein, when mounted, the front face and the rear face of the diaphragm are accessible to a passenger of the vehicle.

18. The interior component of claim 1, wherein the carrier is a carrier of a door lining or a central console or a floor console, the carrier defining a sound box having an opening at the front face of the carrier, wherein a transducer is arranged at a rear side of the sound box to emit sound through the sound box to the front of the carrier.

19. The interior component of claim 18, wherein, when mounted, the opening is located in an area at or below a seat level of a passenger seat in a vehicle cabin.

20. The interior component of claim 1, wherein the diaphragm is part of or covers a digital side view mirror or a digital rearview mirror.

21. The interior component of claim 1, wherein the diaphragm is part of or covers a touch screen.

22. The interior component of claim 1, wherein the diaphragm is part of or covers a decorative appliqué.

23. The interior component of claim 1, wherein the polymer interlaver is a clear damping layer comprising PVB.

24. The interior component of claim 1, wherein the transducer is a piezoelectric transducer arranged at a flat surface portion of the diaphragm.

25. The interior component of claim 1, further including a pattern on the front face of the diaphragm.

26. The interior component of claim 1, wherein an overall thickness of the diaphragm is between 1 and 2 mm and the two glass sheets are tempered.

* * * * *